L. KUTSCHER
Fifth Wheel.
No. 60,016.　　　　　　　　　　　　　　Patented Nov. 27, 1866.
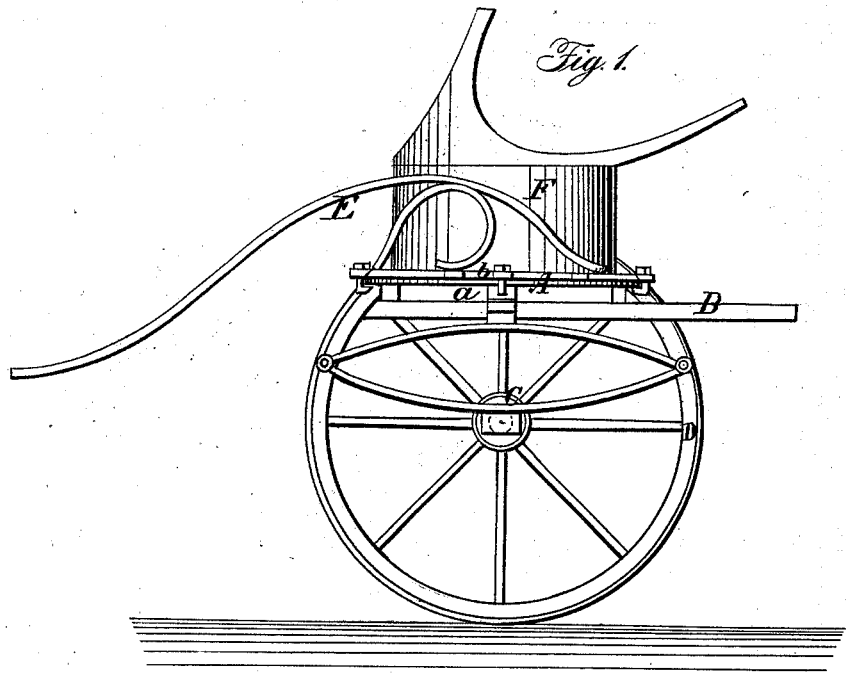
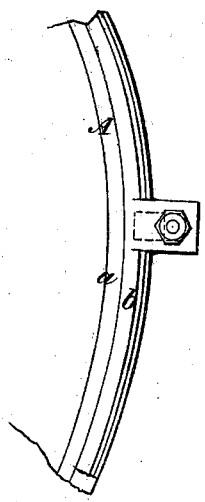
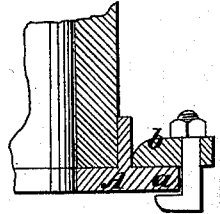
Witnesses:　　　　　　　　　　　　　　Inventor:

United States Patent Office.

IMPROVEMENT IN CARRIAGES.

LOUIS KUTSCHER, OF NEW YORK.

Letters Patent No. 60,016, dated November 27, 1866.

SPECIFICATION.

TO ALL WHOM IT MAY CONCERN:

Be it known that I, LOUIS KUTSCHER, of the city, county, and State of New York, have invented a new and useful Improvement in Carriages; and I do hereby declare that the following is a full, clear, and exact description thereof, which will enable others skilled in the art to make and use the same, reference being had to the accompanying drawings, forming part of this specification, in which—

Figure 1 represents a side elevation of this invention.

Figure 2 is a partial plan of the fifth wheel detached.

Figure 3 is a transverse section of the same showing its connection with the top part or box.

Similar letters of reference indicate like parts.

This invention consists in combining the box or top part of a carriage or wheel vehicle with the lower part of the fifth wheel instead of with the upper part thereof, as usual, in such a manner that said box will always remain at right angles to the tongue and move with the same in either direction independent of the body of the carriage or vehicle, and that the driver is thereby enabled to face in the same direction in which his horses or draught animals pull or move.

A represents the fifth wheel of a carriage or wheel vehicle, which is composed of an inner or lower part, $a$, and an outer or upper part, $b$. The lower part, $a$, is firmly connected to the tongue, B, and to the axle, C, which forms the bearings for the front wheels, D, and the top part, $b$, is secured by loops, or in any other suitable manner, to the body of the carriage or vehicle. F is the box, which, instead of being connected to the top part of the fifth wheel, is connected to the lower part thereof, and consequently such box retains its position towards the tongue, B, independent of the motion of the fifth wheel. In ordinary carriages or vehicles the box is connected to the body of the carriage, or to the top part of the fifth wheel, and if the draught animals turn out sideways, the driver has to turn round on his seat in order to be able to follow with his eyes the motion of the animals. In my carriage or vehicle the box always remains square with the tongue, and the driver faces in the same direction in which the draught animals move.

This invention is particularly applicable to what is known as loop calashes, and it produces a more durable and better work without increasing the cost of the carriage; but it is obvious that my invention can be applied to carriages or wheel vehicles of any desired description, wherever it is desirable to connect the box with the tongue so as to enable the driver to face always in that direction in which his draught animals move.

Having thus described my invention, what I claim as new, and desire to secure by Letters Patent, is—

Attaching the box, F, to the lower part, $a$, of the fifth wheel instead of to its upper part, as usual, substantially as and for the purposes set forth.

LOUIS KUTSCHER.

Witnesses:
WM. DEAN OVERELL,
THEO. TUSCH.